United States Patent [19]

Davies et al.

[11] 3,929,624
[45] Dec. 30, 1975

[54] REFORMING PROCESS USING A URANIUM-CONTAINING CATALYST

[75] Inventors: Evan Ellis Davies, Weybridge; Christopher Ronald Pout, Feltham, both of England

[73] Assignee: The British Petroleum Company Limited, London, England

[22] Filed: Jan. 26, 1973

[21] Appl. No.: 326,815

[30] Foreign Application Priority Data
Feb. 7, 1972    United Kingdom................ 5548/72

[52] U.S. Cl. ................ 208/139; 208/138; 252/441; 252/466 PT
[51] Int. Cl.² .................... C10G 35/08; B01J 27/06
[58] Field of Search ............ 208/138, 139; 252/441, 252/442, 470, 466 PT

[56] References Cited
UNITED STATES PATENTS

| | | | |
|---|---|---|---|
| 2,500,146 | 3/1950 | Fleck et al. | 208/138 |
| 2,861,959 | 11/1958 | Thorn et al. | 252/470 |
| 2,915,515 | 12/1959 | Juveland et al. | 252/442 |
| 2,939,837 | 6/1960 | Berger | 208/136 |
| 3,042,628 | 7/1962 | Cramer et al. | 252/465 |
| 3,579,589 | 5/1971 | Delmon | 252/441 |
| 3,617,491 | 11/1971 | Csicsery | 252/470 |
| 3,619,127 | 11/1971 | Hass et al. | 252/470 |
| 3,649,566 | 3/1972 | Hayes et al. | 252/470 |
| 3,691,064 | 9/1972 | Hayes et al. | 208/139 |
| 3,788,977 | 1/1974 | Dolbear et al. | 208/120 |

*Primary Examiner*—Delbert E. Gantz
*Assistant Examiner*—James W. Hellwege
*Attorney, Agent, or Firm*—Morgan, Finnegan, Pine, Foley and Lee

[57] ABSTRACT

A catalyst suitable for gasoline reforming has 0.01–5% wt of a Pt group metal and 0.01–5% wt of uranium on a silica-free alumina having a surface area of at least 150 m² /g. Alkali metals, alkaline earth metals and Group VI A metals (other than U) are absent, but 0.01–5% wt of rhenium may also be present as may 0.01–5% wt of chlorine. Reforming using such catalysts is also claimed at 300°–600°C, 1–70 bars gauge, 0.01–10 v/v/hr and 0.01–20:1 hydrogen: hydrogen mole ratio.

The presence of uranium improves catalyst activity and stability to deactivation.

4 Claims, 4 Drawing Figures

REFORMING PROCESS USING A URANIUM-CONTAINING CATALYST

This invention relates to catalysts containing a platinum group metal (i.e. platinum, palladium, ruthenium rhodium, osmium or iridium) and to their use for the catalytic reforming of hydrocarbons.

Catalysts of a platinum group metal, particularly platinum or palladium, on a refractory support are well known. The metal, which may be present in an amount of 0.01 to 5% wt, has good activity for hydrogenation or dehydrogenation and dehydrocyclisation depending on the process conditions. By a suitable choice of support, additional functions of e.g. isomerisation and cracking can be given to the catalyst. The preferred support for reforming catalysts is alumina, with or without 0.1–5% wt of a halogen, preferably chlorine.

For many years platinum was the sole metallic component of reforming catalysts, but in U.K. Pat. No. 1,151,639, rhenium was proposed as an additional component. The main effect of the rhenium was to improve the stability of the catalyst to deactivation allowing operation under more severe conditions e.g. lower hydrogen: hydrocarbon mole ratios and lower pressure. Subsequent to the discovery of rhenium, other metals have been proposed as stabilising components of reforming catalysts, notably tin, lead and germanium.

The mechanism by which the second metal stabilises the catalyst is still not understood. Possibly there are different mechanisms depending on the second metal used. The form of the second metal may also vary, and though the term metal is used for convenience, the metal is not necessarily present in elemental form.

A further element which improves platinum group metal reforming catalysts in terms primarily of activity, but which improves stability as well, has now been found. This further element can also be used in combination with known promoters for platinum group metal reforming catalysts.

DETAILED DESCRIPTION OF THE INVENTION

Figure 1:
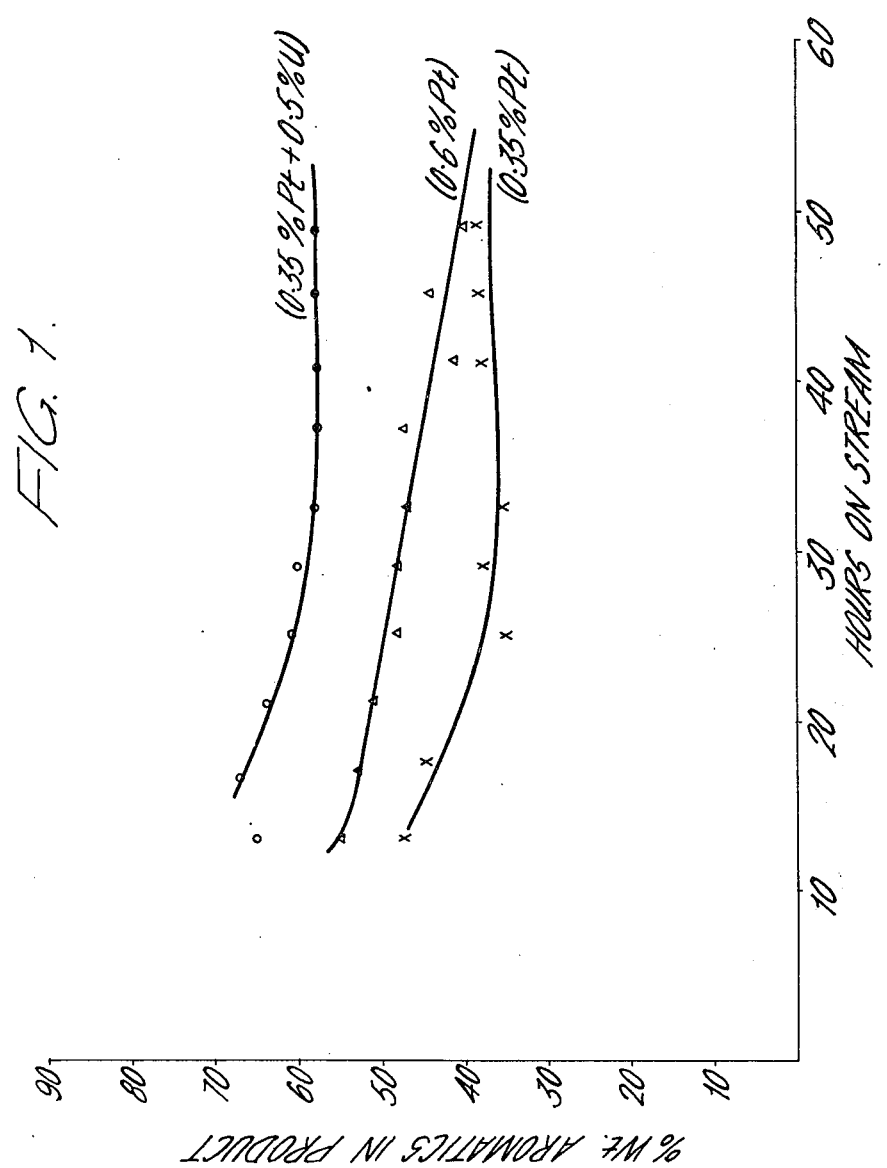
FIGS. 1–4 are each graphical illustrations of the improved results obtained employing the catalysts and process of the present invention.

According to the present invention a catalyst suitable for the reforming of hydrocarbons boiling in the range 15°–204°C comprises from 0.01 to 5% wt of a platinum group metal, from 0.01 to 5 % wt of uranium, calculated as metal, and a silica-free alumina having a surface area of at least 150 m$^2$/g, said catalyst being free of alkali metals and alkaline earth metals and other metals of Group VIA of the Periodic Table.

Uranium is the last element in Group VIA of the Periodic Table according to Mendeleef. The lighter elements in this sub-group viz chromium, molybdenum and tungsten are well known dehydrogenation/dehydrocyclisation catalysts, but comparatively little interest has been shown in uranium, which has little dehydrogenation/dehydrocyclisation activity in itself. Its function in combination with a platinum group metal is not simply to supplement the dehydrogenation/dehydrocyclisation activity of the platinum group metal, which is already many times greater than that of even the most active Group VIA metal. The function of the uranium may, indeed, be more associated with some improvement of the support rather than the platinum group metal, since it is not reducable under normal reducing conditions and cannot, therefore, form any alloy with platinum group metals.

Preferably the amount of the platinum group metal is from 0.1 to 2% wt and the preferred platinum group metal is platinum itself.

The amount of uranium is preferably also from 0.1 to 2% wt.

The term "silica-free alumina" means an alumina with less than 2% wt of silica. The preferred surface area for the alumina is at least 200 m$^2$/g. and a convenient practical upper limit is 500 m$^2$/g. The alumina may consist predominantly of gamma-alumina or eta-alumina and may be any alumina known to be suitable as a support for reforming catalysts. Such aluminas have a moderate, controlled acidity to promote the desirable side-reactions of isomerisation of naphthenes and paraffins, and hydrocracking of paraffins, this acidity being supplemented, if necessary, by from 0.1 to 5% wt of halogen particularly chlorine or fluorine. The preferred amount of halogen may be from 0.1–3% wt and the preferred halogen is chlorine. The term "free of alkali metals and alkaline earth metals" means a total content of such metals of below 0.1% wt, this relatively low level being required to ensure the required acidity.

The term "free of other metals of Group VIA of the Periodic Table" also means a total content of such metals of below 0.1% wt, this requirement emphasising the essentially different nature of uranium from the other Group VIA metals.

According to a particularly preferred embodiment the catalyst may contain a platinum group metal and rhenium or a metal acting similarly to rhenium.

The amount of rhenium may also be from 0.01 to 5% wt, preferably 0.1 to 2% wt.

The fact that uranium will further improve a catalyst already improved by the addition of rhenium is considered particularly surprising and illustrative of the complexity of the mechanism by which uranium improves reforming catalysts. It is believed that, in platinum-rhenium catalysts, the rhenium is closely associated with the platinum and is present in reduced form in the active catalyst. As previously stated, the uranium may be more associated with the support and is unlikely to be reduced under the normal conditions of preparation and use of reforming catalysts.

Suitable components for use in the preparation of the catalysts are uranyl salts particularly uranyl nitrate, acetate, or sulphate. Uranium halides particularly uranium chloride are also suitable. These salts may be used in aqueous or alcoholic solutions.

Preferred solutions are aqueous solutions of uranyl acetate and uranyl chloride with strengths of from 0.00001 to 0.1 M. At such concentrations and with the previously stated amounts of uranium it has been found that excessively high contents of chloride on the finished catalysts are not obtained.

The method of preparation of the catalyst as regards the alumina, the platinum group metal, and the rhenium and the halogen if present, may follow standard practice.

Thus the platinum group metal may be added by impregnation using chloroplatinic acid or polyammine platinum salts, and the rhenium may be added using perrhenic acid or a perrhenate.

The uranium compound may be added to the alumina support during its formation or to the alumina after its formation. Thus it may be added to a solution which forms the precursor of the alumina support and the precursor material may then be hydrolysed to an alumina hydrosol or hydrogel and subsequently dried and calcined. Alternatively the compound may be added to an already formed hydrosol or hydrogel which is then dried and calcined. If the compound is added during the formation of the support, it may be possible to use finely ground particles of one or more of the uranium oxides as an alternative to the previously described salts.

Preferably, however, the uranium compound is added to the preformed alumina by impregnation, preferably using the previously described salts. It may be added before or after the addition of the platinum group metal, the preferment varying according to the type of catalyst used.

When the catalyst is to contain only platinum and uranium as metallic components, the uranium is preferably added before the platinum. Addition of uranium after the platinum gives a catalyst of good reforming activity but also a high cracking activity. Although such a catalyst may have certain specialised uses e.g. the simultaneous production of gasoline and LPG, it is not preferred for normal reforming duties. When the catalyst contains platinum and rhenium as well as uranium, the uranium may be added before or after the other metals. Addition after the platinum and rhenium is in fact preferred, the resultant catalyst being suitable for normal reforming duties. Thus the uranium may be added to a pre-formed, commercially available platinum-rhenium-alumina catalyst.

The reason for this variation in behaviour is not fully understood, and further illustrates the difficulty of understanding the precise mechanism by which the uranium improves the catalyst.

Calcination during and/or at the completion of the catalyst preparation may be under normal conditions e.g. 250° to 600°C for 1 to 24 hours. Desirably the catalyst is reduced before use, preferably in situ in a reactor by heating in a reducing atmosphere, e.g. a flowing stream of hydrogen at 200° to 550°C for 1 to 24 hours. This will reduce the platinum group metal but, as indicated above, is unlikely to reduce the uranium compound. Probably the preferred salts used in the preparation are reduced to one or more of the uranium oxides, but the exact form of the uranium in the finished catalyst is not fully known.

The present invention includes a process for the catalytic reforming of hydrocarbons boiling in the range 15°–250°C comprising contacting the hydrocarbons under reforming conditions with a catalyst comprising from 0.1 to 5% wt of a platinum group metal from 0.01 to 5% wt of uranium calculated as metal, and a silica-free alumina having a surface area of at least 150 m²/g, said catalyst being free of alkali metals and alkaline earth metals and other metal os Group VIA of the Periodic Table.

Preferred features of the catalyst may be as set out above.

The feedstock may be a single hydrocarbon or a mixture of hydrocarbons, preferably a gasoline fraction boiling in the range 15°–204°C, and more particularly a gasoline fraction boiling in the range 70°–170°C. The feedstock has preferably a low sulphur content, for example a sulphur content of less than 5 ppm wt. Dehydrogenation, dehydrocyclisation, isomerisation, and hydrocracking may be reactions involved in the reforming operation to give a product of increased octane number and/or aromatic content.

The process conditions may be chosen from the following ranges:

| | | |
|---|---|---|
| Temperature °C | 300 – 600 | preferably 400 – 550 |
| Pressure bars gauge | 1 – 70 | preferably 3 – 35 |
| Space velocity v/v/hr | 0.1 – 10 | preferably 0.5 – 5 |
| $H_2$ : HC mole ratio | 0.1 – 20:1 | preferably 1:1 – 10:1 |

The invention is illustrated by the following examples.

EXAMPLE 1

50 g of a commercially available alumina support for catalytic reforming catalysts supplied by Engelhard Industries Inc. having a surface area of 385 m²/g and a bulk density of 0.78 g/ml was calcined at 550°C for 2 hours, cooled in a desiccator, and then impregnated with 50 ml of a solution containing 0.4 g of uranyl acetate in deionised, distilled water. The catalyst was allowed to stand at room temperature in the solution for 24 hours, and was then dried at 120°C for 24 hours, calcined at 550°C for 2 hours and cooled in a desiccator. The cool catalyst was impregnated with 50 ml of a solution containing 0.45 g of chloroplatinic acid, allowed to stand for 24 hours, dried at 120°C for 24 hours and calcined at 550°C for 2 hours.

The catalyst contained 0.35% wt, Pt; 0.37% wt U, and 0.55% Cl.

5 ml of the catalyst were placed in a reactor and reduced at atmospheric pressure in a stream of $H_2$ flowing at 20 liters/hour. The temperature was raised to 510°C at 100°/hour, held at 510 for 2 hours and cooled back to 350°C still under the flow of $H_2$.

The catalyst was tested for reforming activity using n-heptane as feedstock at 500°C, 24.2 bars gauge, 6.0 v/v/hr and a $H_2$ : heptane mole ratio of 7:1. Once through hydrogen was used, the exit gas rate being 45 liters/hour. The catalyst was in the form of 1/16" × 1/16" extrudates. The results are shown in FIG. 1 and compared with commercial catalysts formed from the same alumina base and containing 0.35 and 0.6% wt Pt and 0.5 and 0.75% wt Cl respectively. In the graph, % wt of aromatics in the $C_5$ + product is plotted against hours on stream. It will be seen that the uranium containing catalyst is not only more active for aromatics production but also less prone to deactivation with hours on stream.

EXAMPLE 2

This example compares the effect of uranium using three sets of catalysts and a gasoline feedstock. Each catalyst was in the form of 1/16" × 1/16" extrudates and 50 g of catalyst were used in each preparation. The feedstock was a desulphurised naptha with a boiling range of 87° to 169°C and an average molecular weight of 110. It contained 60.1% wt paraffins, 26.0% wt naphthenes, 13.9% wt aromatics and 0.7 ppm wt of sulphur. The process conditions were:

| | |
|---|---|
| Average bed temperature °C | 525 |
| Pressure bars g | 17.5 |
| Space velocity v/v/hr | 8.0 |
| $H_2$ : HC mole ratio | 3.5:1 |
| $H_2$ flow rate v/v/hr | 4600 |

The three sets of catalysts were
i. Catalysts A and B

Catalyst A was the commercial catalyst containing 0.35 wt Pt and 0.5% wt Cl used in Example 1.

A platinum-uranium catalyst (Catalyst B) was prepared as for Example 1 except that the impregnation with a uranium salt used 50 ml of a solution containing 0.4 g of uranyl chloride in deionised, distilled water. It contained 0.31% wt Pt, 0.23% wt U, and 0.83% wt Cl.

ii. Catalysts C, D and E

Catalyst C was a commercial reforming catalyst containing 0.35% wt Pt, 0.35% wt Re and 0.9% wt Cl on an eta-alumina having a surface area of 430 m²/g and a bulk density of 0.78 g/ml Catalyst D was prepared from Catalyst C by calcining at 550°C for 2 hours, cooling in a desiccator, impregnating at room temperature with 50 ml of an aqueous solution containing 0.4 g of uranyl chloride for 24 hours, drying at 120°C for 24 hours and calcining at 550°C for 2 hours. It contained 0.35% wt Pt, 0.35% wt Re, 0.33% wt U and 0.84% wt Cl.

Catalyst E was prepared similarly to Catalyst D except that the impregnating solution was 50 ml of an aqueous solution containing 0.4 g of uranyl acetate. The finished catalyst had 0.35% wt Pt, 0.35% wt Re, 0.36% wt U and 0.9% wt Cl.

iii. Catalyst F and G

Catalyst F was another commercial reforming catalyst containing 0.30% wt Pt, 0.30% wt Re and 0.72% wt Cl on a gamma-alumina having a surface area of 220 m²/g and a bulk density of 0.70 g/ml.

Catalyst G was prepared from it using the same procedure as catalyst D. It contained 0.30% wt Pt, 0.30% wt Re, 0.28% wt U and 0.78% wt Cl.

Each catalyst was reduced in the reactor at 500°C and 17.5 bars g. for 4 hours using a $H_2$ flow of 50 liters/hour and was tested under the conditions set out above.

The change-over from the reduction to the reforming was made by cooling the catalyst to 350°C under the same hydrogen flow as the reduction, introducing feedstock at 200 ml/hr, increasing $H_2$ flow to 115 liters/hour, and raising the temperature to 525°C at a rate of 15°C/hour. 25 ml of each catalyst were used diluted with 125 ml of calcined inert quartz particles.

Figure 2:
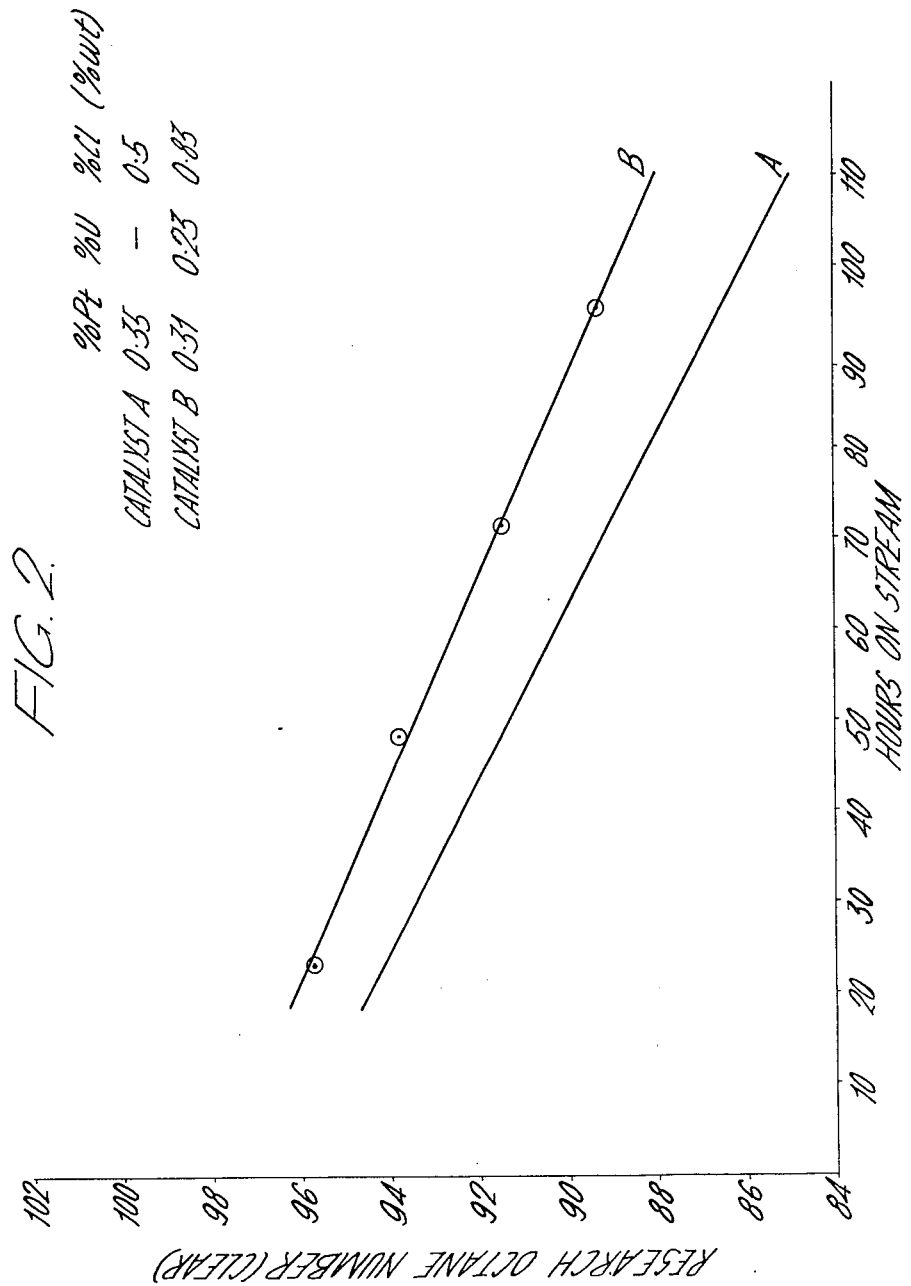

The results with catalyst A and B are shown in FIG. 2, which is a graph plotting $C_5$ + product research octane number (clear) against hours on stream. The improved results shown in Example 1 with the uranium containing catalyst are confirmed with a gasoline feedstock, the uranium containing catalyst B having both improved activity and stability to deactivation.

Figure 3:
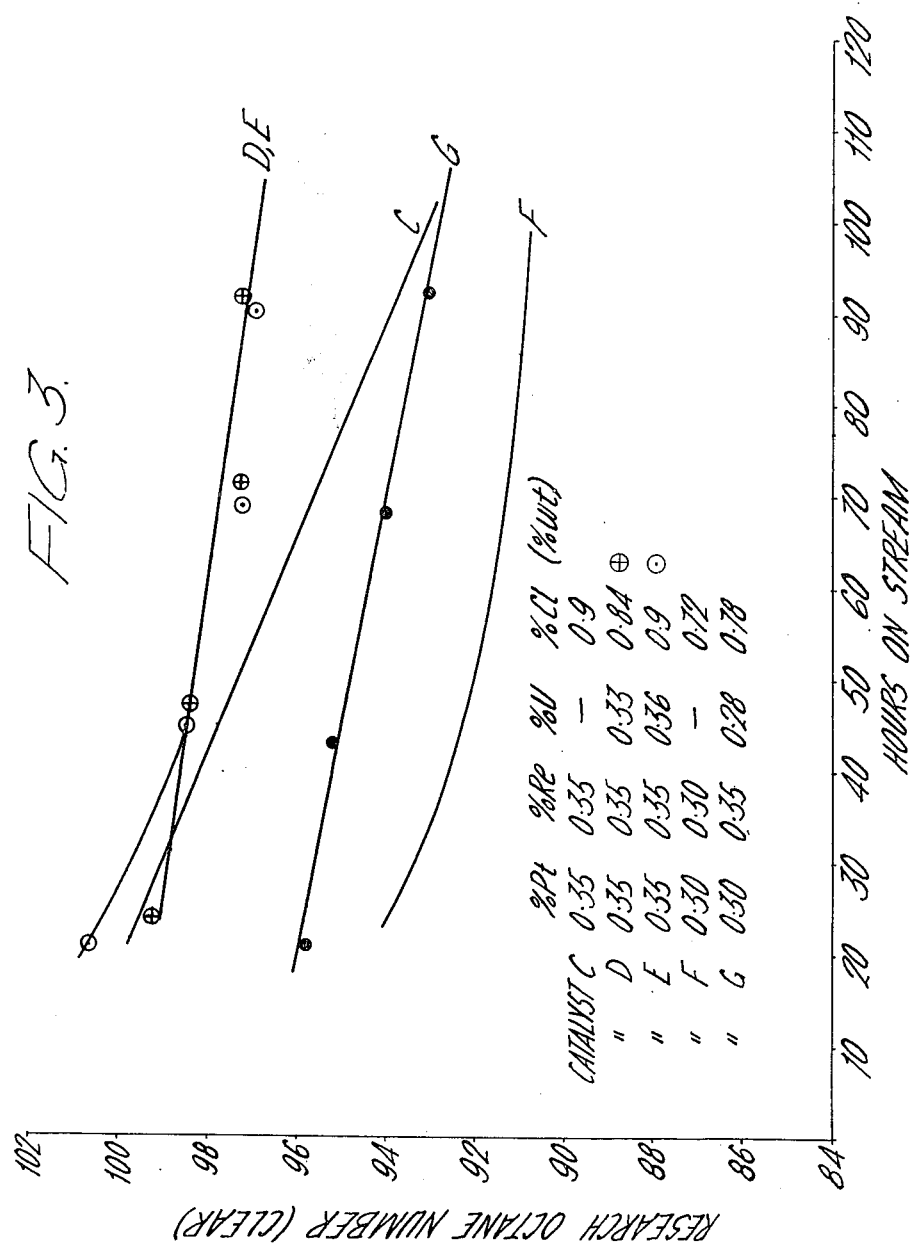

FIG. 3 shows the results with the rhenium containing catalysts C, D, E, F and G. The much greater stability to deactivation of the uranium-containing catalysts D and E as compared with catalyst C is immediately apparent. The initial difference between catalyst D impregnated with uranyl chloride and catalyst E impregnated with uranyl acetate disappears by 50 hours on stream indicating that the salt used is not critical. With catalysts F and G the main improvement from the addition of uranium is in improved activity.

EXAMPLE 3

This example shows an extended run of 800 hours using a gasoline feedstock and recovering a $C_5$ + product of constant octane number.

The feedstock was a desulphurised naphtha with a boiling range of 70° to 160°C and an average molecular weight of 107. It contained 57 % wt paraffins, 31% wt naphthenes, 12% wt aromatics and < 1 ppm wt. of sulphur. The process conditions were

| | |
|---|---|
| Pressure bars gauge | 34 |
| Space velocity v/v/hr | 3 |
| $H_2$ : HC mole ratio | 3.5:1 |
| Temperature °C | Adjusted as required to give a product having a Research Octane Number (clear) of 92.5. |

Two catalysts were used:

i. A commercial reforming catalyst, in the form of 1/16 inch diameter spheroids, having 0.375% wt Pt and 0.88% wt Cl on a gamma-alumina having a surface area of 190 m²/g and a bulk density of 0.54 g/ml.

ii. A platinum-uranium catalyst containing 0.37% wt Pt, 0.32% wt U and 0.82% wt Cl in the form of 1/16" × 1/16" extrudates.

The reactor was pressurised to a hydrogen-pressure of 13.6 bars gauge and the recycle rate of hydrogen was adjusted to 150 liters/hour. The temperature was raised to 500°C at 50°C/hour and kept at 500°C for 4 hours to reduce the catalyst.

The temperature was then lowered to 370°C and the plant pressure was adjusted to 34 bars gauge. Feed was introduced at 3 v/v/hour and the gas recycle rate was then adjusted to give a $H_2$ : Hydrocarbon ratio of 3.5:1. The temperature was raised to 454°C at 11°C/hour and then to 500°C at 6°C/hour. The average bed temperature was adjusted to 485°C. Thereafter the average bed temperature was adjusted to give a R.O.N. (clear) of 92.5.

Figure 4:
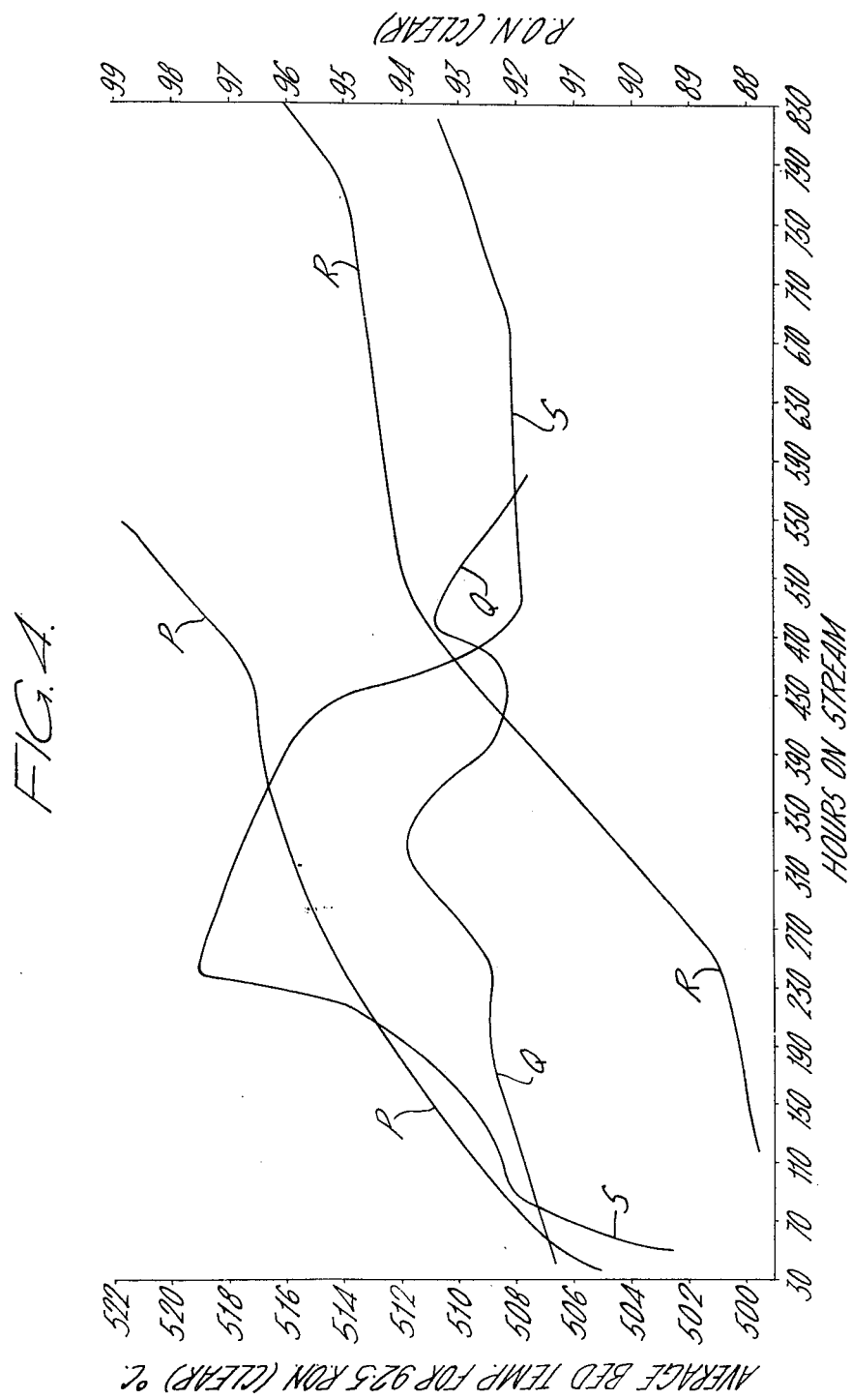

The results are shown in FIG. 4 which is a graph plotting the average bed temperature and the research octane number (clear) of the $C_5$ + product against hours on stream. The curves are:

P - average bed temperature with the Pt-Al₂O₃ catalyst

Q - product research octane number (clear) with the Pt-Al₂O₃ catalyst

R - average bed temperature with the Pt-U-Al₂O₃ catalyst

S - product research octane number (clear) with the Pt-U-Al₂O₃ catalyst

Curve P shows that, with the Pt-Al₂O₃ catalyst, a steady, relatively rapid increase in temperature was required to maintain an average product octane number of 92.5 (curve Q).

Curve R shows that Pt-U-Al₂O₃ had a 8°–9°C temperature advantage over the Pt-Al₂O₃ catalyst for the first 230 hours on stream and a much slower rate of deactivation. At 230 hours on stream the temperature was raised to an average bed temperature of 513.7°C with the Pt-U-Al₂O₃ catalyst (but not the Pt-Al₂O₃ catalyst) to give a product octane number of 97.5 (Curve S). The temperature was raised to maintain a R.O.N. (clear) of about 97 until 430 hours on stream. As would be expected the rate of deactivation increased. For this period curve R shows the calculated temperature required to give a product octane number of 92.5, and not the actual temperature, assuming that a temperature change of 1°C gives an octane number change of 0.5. At 470 hours on stream the temperature was lowered to 510°C. The product octane number returned to 92 and the rate of deactivation decreased. Despite the period of operation at higher temperature and higher product octane number, the Pt-U-Al₂O₃ retained a substantial temperature advantage over the Pt-Al$_2$O$_3$ catalyst, with this temperature advantage steadily increasing because of the lower deactivation rate. The run was terminated voluntarily at 830 hours on stream.

C$_5$ + product yield with the two catalysts were:

| | | |
|---|---|---|
| Pt-Al$_2$O$_3$ | Initial | 83% wt at 92.5 R.O.N. (clear) |
| | Final (at 550 HOS) | 81% wt |
| Pt-U-Al$_2$O$_3$ | Initial | 82% wt |
| | Final (At 550 HOS) | 80% wt |
| | 800 HOS | 79.5 |

These yield figures show that the improved activity and selectivity of the uranium-containing catalyst is obtained at the expense of a 1% lower yield at 92.5 R.O.N. (clear). However, the product yields with the uranium-containing catalyst improve relative to the catalyst containing platinum alone at higher product octane numbers.

We claim:

1. A process for the reforming of hydrocarbons boiling in the range 15°–204°C comprising contacting the hydrocarbons under reforming conditions of 300° to 600°C, 1 to 70 bars gauge, 0.1 to 10 v/v/hr and 0.1 to 20:1 hydrogen : hydrocarbon mole ratio with a catalyst comprising from 0.01 to 5% wt. of a platinum group metal, 0.01 to 5% wt. of uranium, 0.1 to 2% wt. of rhenium, and a silica-free alumina having a surface area of at least 150 m$^2$/g, said catalyst being free of alkali metals and alkaline earth metals and other metals of Group VIA of the Periodic Table.

2. A process as claimed in claim 1 wherein the catalyst comprises from 0.1 to 2% wt of platinum and from 0.1 to 2% wt of uranium.

3. A process as claimed in claim 1 wherein the catalyst contains from 0.1 to 3% wt of chlorine.

4. A process as claimed in claim 1 which is operated at 400° to 550°C, 3 to 35 bars gauge, 0.5 to 5 v/v/hr and 1 to 10:1 hydrogen:hydrocarbon mole ratio.

* * * * *